United States Patent [19]

Wolfe et al.

[11] Patent Number: 5,428,992
[45] Date of Patent: Jul. 4, 1995

[54] GENERATING A ONCE-PER-CYCLE SIGNAL FOR A LOCOMOTIVE DIESEL ENGINE

[75] Inventors: Christopher E. Wolfe, Schenectady; Gary R. Livingston, Clifton Park, both of N.Y.; James R. Beal, North East, Pa.

[73] Assignee: General Electric Company, Schenectady, N.Y.

[21] Appl. No.: 258,881

[22] Filed: Jun. 13, 1994

[51] Int. Cl.6 ............................................. G01L 23/00
[52] U.S. Cl. ..................................... 73/116; 73/118.1; 73/119 R; 73/119 A; 324/164
[58] Field of Search .................. 324/164, 160; 73/116, 73/866.5, 118.1, 119 A, 119 R; 200/203, 207, 216

[56]  References Cited

U.S. PATENT DOCUMENTS

| 4,066,949 | 1/1978 | Condrac .............................. 324/160 |
| 4,483,184 | 11/1984 | Kunzfeld ............................ 73/117.2 |
| 4,545,238 | 10/1985 | Kinoshita et al. ................. 73/119 A |
| 4,643,022 | 2/1987 | Werlberger et al. ............... 73/117.3 |

Primary Examiner—Richard E. Chilcot, Jr.
Assistant Examiner—Max H. Noori
Attorney, Agent, or Firm—Douglas E. Erickson; Paul R. Webb, II

[57] ABSTRACT

A locomotive diesel engine test assembly generates a once-per-cycle signal phased to the top dead center of a predetermined piston in its cylinder. A locomotive diesel engine crankcase door is hermetically attached to the crankcase so as to cover a camshaft located therein. An outer tube extends through and is hermetically and fixedly attached to the crankcase door, and an inner tube extends through and is hermetically and pivotably attached to the outer tube. A proximity sensor is attached to the inner tube and positioned near and generally perpendicular to the camshaft. A marker is attached to the circumference of the camshaft and is detectable by the proximity sensor once per revolution of the camshaft.

9 Claims, 1 Drawing Sheet

GENERATING A ONCE-PER-CYCLE SIGNAL FOR A LOCOMOTIVE DIESEL ENGINE

BACKGROUND OF THE INVENTION

The present invention relates generally to locomotive diesel engines, and more particularly to a test assembly for generating a once-per-cycle signal for such engines phased to when a predetermined piston is at the top dead center of its cylinder.

Locomotive engines typically are two-stroke or four-stroke diesel engines having 8, 12, or 16 cylinders. Such engines also include conventional crankcases containing crankshafts for reciprocal motion of the pistons and camshafts for reciprocal motion of the valves. In the four-stroke engine, the crankshaft makes two revolutions per cycle, and the camshaft makes one revolution per cycle. A locomotive diesel engine condition monitoring and diagnostic system has been proposed for gathering in-service engine data to be used as a baseline for later periodic engine tests to determine if the engine is later experiencing actual or incipient problems. The goal of such proposed testing is to improve engine reliability and locomotive availability by replacing during routine inspections worn or damaged parts that are about to fail instead of replacing those parts after they have failed in service. Such in-service failures result in costly out-of-service time for the locomotives. Such proposed periodic testing of the locomotive diesel engines would be carried out when the locomotives are brought to railroad maintenance shops for routine engine inspection.

Such proposed engine diagnostic testing requires relating engine test data (such as engine vibration) to a once-per-cycle signal phased to when a predetermined piston is at the top dead center of a cylinder of the engine. Existing lab engines (stationary locomotive diesel engines bolted to the floor) and existing engineering engines (engines of engineering locomotives which run on tracks and are used for engineering research, test, and development) include exposed crankshafts having a special bearing and (for some such engines) an optically encoded disk attached thereto. A light aimed at the disk is used to generate a signal once per revolution of the disk. To install and remove such a test assembly as part of an engine diagnostic testing program on an in-service locomotive would require between four and six hours, a time not considered acceptable. What is needed is such a test assembly which can be installed and removed in a much shorter time.

SUMMARY OF THE INVENTION

It is an object of the invention to provide a locomotive diesel engine test assembly which generates a once-per-cycle signal and which can be installed and removed from the locomotive diesel engine in a shorter time than with known techniques.

The locomotive diesel engine test assembly of the invention includes a locomotive diesel engine crankcase door, an outer tube, an inner tube, a proximity sensor, and a marker. The door is hermetically attachable to a locomotive diesel engine crankcase so as to cover a locomotive diesel engine camshaft located within the crankcase. The outer tube extends through and is hermetically and fixedly attached to the door, and the inner tube extends through and is hermetically and pivotably attached to the outer tube. The proximity sensor is attached to the inner tube and is positioned near and generally perpendicular to the camshaft when the door is attached to the crankcase. The marker is attachable to the circumference of the camshaft and is detectable by the proximity sensor once per revolution of the camshaft when the marker is attached to the camshaft and the door is attached to the crankcase.

Several benefits and advantages are derived from the invention. The test assembly of the invention interacts with the camshaft and not the crankshaft. Conventional locomotive diesel engines, like the General Electric Dash 8 locomotive diesel engines, already have quick access crankcase doors located near the camshaft. By modifying a conventional spare crankcase door with the outer and inner tubes and the proximity sensor of the invention, the original crankcase door of an engine can be removed, the modified door can be installed, and the marker of the invention can be installed in only about 25 minutes. After engine testing is completed, the modified door can be removed, the marker can be removed, and the original crankcase door can be replaced in only about 10 minutes. Thus, the overall time to install and remove the test assembly is only about 35 minutes per engine!

BRIEF DESCRIPTION OF THE DRAWINGS

The accompanying drawing illustrates a preferred embodiment of the present invention wherein:

DETAILED DESCRIPTION OF THE INVENTION

Figure 1:
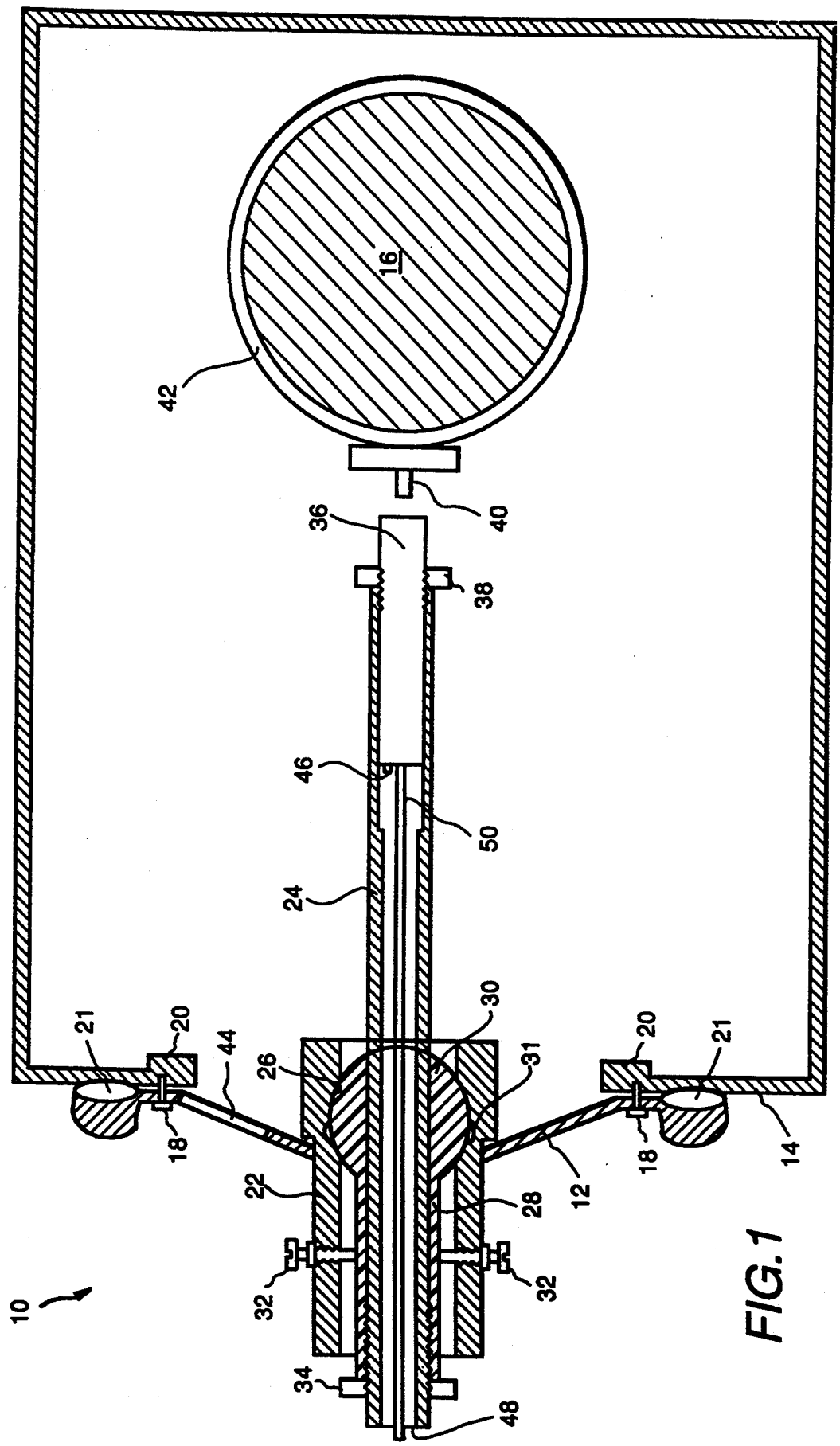
FIG. 1 is a schematic sectional view (with only the larger elements cross-hatched for clarity) of the locomotive diesel engine test assembly of the invention installed in part on a locomotive diesel engine crankcase and in part on the camshaft contained therein, wherein the crankcase door is shown as being bolted to the crankcase.

Referring now to the drawing, FIG. 1 shows a preferred embodiment of the locomotive diesel engine test assembly 10 of the invention. The test assembly 10 includes a locomotive diesel engine crankcase door 12 hermetically attachable to a locomotive diesel engine crankcase 14 so as to cover a locomotive diesel engine camshaft 16 located within the crankcase 14. In FIG. 1, the crankcase door 12 is shown attached to the crankcase 14 by bolts 18 extending through the crankcase door 12 and threadably extending into blind threaded holes in a flange 20 of the crankcase 14. A more preferred attachment (not shown in the figure for clarity) is that provided by a conventional locomotive diesel engine crankcase door having an outside handle which may be turned to rotate and disengage an inside, spring-loaded locking bar, as is known to those skilled in the art. An O-ring 21 is disposed between the crankcase door 12 and the crankcase 14 to provide for hermetic sealing since the air within the crankcase 14 is kept at a pressure differential of generally 10 inches of water (with respect to atmospheric pressure), as is known to the artisan.

The test assembly 10 also includes an outer tube 22 extending through and hermetically and fixedly attached to the crankcase door 12. Preferably, the crankcase door 12 is a carbon steel crankcase door 12, the outer tube 22 is a carbon steel outer tube 22, and the outer circumference of the outer tube 22 is welded to the crankcase door 12 to provide for structural support and hermetic sealing.

The test assembly 10 additionally includes an inner tube 24 extending through and hermetically and pivotably attached to the outer tube 22. Preferably, the outer tube 22 has one end with a socket 26, and the test assembly 10 additionally includes a sleeve 28 disposed between the inner and outer tubes 24 and 22 and having one end with a ball 30 hermetically and pivotably engaging the socket 26 of the outer tube 22. An O-ring 31 is disposed between the ball 30 of the sleeve 28 and the socket 26 of the outer tube 22 to provide for hermetic sealing since, as previously mentioned, the air within the crankcase 14 is kept at a pressure differential of generally 10 inches of water (with respect to atmospheric pressure). In an exemplary embodiment, the test assembly 10 additionally includes a plurality of set screws 32 threadably attached to the outer tube 22 and contacting the sleeve 28 for setting the pivotal position (i.e., for securing a desired pivotal position) of the sleeve 28 with respect to the outer tube 22. In a preferred embodiment, the inner tube 24 is a carbon steel inner tube 24, the sleeve 28 is a plastic sleeve 28, and the inner tube 24 is threadably attached to the sleeve 28 so as to provide for longitudinal adjustment of the position of the inner tube 24 within the sleeve 28. A lock nut 34 is provided to secure the desired longitudinal position of the inner tube 24.

The test assembly 10 further includes a proximity sensor 36 attached to the inner tube 24 and disposed proximate and generally perpendicular to the camshaft 16 when the crankcase door 12 is attached to the crankcase 14. Preferably, the proximity sensor 36 is a conventional proximity sensor 36, as is known to those skilled in the art, which is threadably attached to the inner tube 24 to provide hermetic sealing between the proximity sensor 36 and the inner tube 24 and which is secured in place with a lock nut 38.

The test assembly 10 moreover includes a marker 40 attachable to the circumference of the camshaft 16, the marker 40 detectable by the proximity sensor 36 once per revolution of the camshaft 16 when the marker 40 is attached to the camshaft 16 and the crankcase door 12 is attached to the crankcase 14. Preferably, the marker 40 is fixedly attached to a hose clamp 42, and the hose clamp 42 is attached to the camshaft 16. In an exemplary embodiment, the proximity sensor 36 is an eddy-current proximity sensor 36, the marker 40 is a carbon steel marker 40 spot welded to the hose clamp 42, and the hose clamp 42 is a stainless steel hose clamp 42. In a preferred embodiment, the crankcase door 12 includes an opening, and the test assembly 10 further includes an access window 44 disposed in the opening. The access window 44 may be bolted to the crankcase 14 with an intervening O-ring to provide hermetic sealing (such attachment omitted in the figure for clarity) and would be removed during circumferential positioning of the hose damp 42 on the camshaft 16 so as to align the marker 40 with the proximity sensor 36 when a predetermined piston was at the top dead center of its cylinder (such piston and cylinder omitted from the figure for clarity). The access window 44 also allows a visual inspection of the area inside the crankcase 14 containing the proximity sensor 36 and the hose clamp 42 while the engine is running. In this preferred embodiment, the proximity sensor 36 includes a light-emitting diode (LED) 46 which flashes when the proximity sensor 36 detects the presence of the marker 40, the flash being detectable by an observer from the open outside end 48 of the inner tube 24. The LED 46 helps to determine the correct pivotal position of the sleeve 28 and the correct longitudinal position of the inner tube 24. It is noted that the proximity sensor 36 includes wiring 50 leading outside the open outside end 48 of the inner tube 24 to the power supply and detection electronics (not shown in the figure) of the proximity sensor 36 and that the proximity sensor 36 generates a once-per-cycle signal for a locomotive diesel engine phased to when a predetermined piston is at the top dead center of its cylinder.

The test assembly 10 of the invention is employed as follows. An in-service diesel locomotive is brought to a railroad maintenance shop for routine inspection. A predetermined one of its diesel engine crankcase doors is removed. The hose clamp 42 is loosely fit over the camshaft 16. The crankcase door 12 of the invention, having the inner and outer tubes 24 and 22 and the proximity sensor 36 attached thereto but having the access window 44 removed therefrom, is attached to the crankcase 14. The engine is cranked over so that the predetermined piston is at its exhaust/intake top-dead-center position in its cylinder. The longitudinal position of the inner tube 24 is threadably adjusted with respect to the sleeve 28, the pivotal position of the sleeve 28 is pivotably adjusted with respect to the outer tube 22, and the circumferential position of the marker 40 is adjusted by circumferentially adjusting the hose damp 42 until the LED 46 barely flashes, as is within the skill of the artisan. The access window 44 is replaced, and the locomotive diesel engine is started. The proximity sensor 36 will generate a once-per-cycle signal phased to the top dead center of the predetermined piston. Appropriate engine testing probes, such as vibration sensors, may be attached to the engine and have their output benchmarked against the once-per-cycle signal of the proximity sensor 36 to help diagnose actual and incipient engine problems so that parts can be replaced during routine engine inspection instead of waiting to replace those parts when they fail in service. After the engine testing is completed, the crankcase door 12 is removed, the hose damp 42 is removed, and the original crankcase door is replaced. The test assembly 10 is now ready to be installed on the next locomotive diesel engine needing testing.

Applicants conducted tests of their test assembly 10 on one locomotive diesel engine lab engine and on three production locomotive diesel engines. Such test assembly 10 was installed in generally 25 minutes and removed in generally 10 minutes (including 5 minutes to allow the oil in the crankcase 14 to settle, with such oil being omitted in the figure for clarity). The test assembly 10 determined the top-dead-center position to within 1.2 degrees plus or minus 0.15 degree in comparison to the top-dead-center determination made by the conventional optically encoded disk assembly connected to the crankshaft (not shown in the figure) of such lab and engineering engines.

The foregoing description of a preferred embodiment of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

We claim:

1. A locomotive diesel engine test assembly comprising:

a) a locomotive diesel engine crankcase door hermetically attachable to a locomotive diesel engine crankcase so as to cover a locomotive diesel engine camshaft located within the crankcase;
b) an outer tube extending through and hermetically and fixedly attached to said door;
c) an inner tube extending through and hermetically and pivotably attached to said outer tube;
d) a proximity sensor attached to said inner tube and disposed proximate and generally perpendicular to the camshaft when said door is attached to the crankcase; and
e) a marker attachable to the circumference of the camshaft, said marker detectable by said proximity sensor once per revolution of the camshaft when said marker is attached to the camshaft and said door is attached to the crankcase, wherein said outer tube has one end with a socket, and also including a sleeve disposed between said inner and outer tubes and having one end with a ball hermetically and pivotably engaging said socket of said outer tube.

2. The test assembly of claim 1, wherein said inner tube is threadably attached to said sleeve.

3. The test assembly of claim 2, also including a plurality of set screws threadably attached to said outer tube and contacting said sleeve for setting the pivotal position of said sleeve with respect to said outer tube.

4. The test assembly of claim 3, wherein said door includes an opening and also including an access window disposed in said opening.

5. The test assembly of claim 4, wherein said proximity sensor includes a light-emitting diode.

6. The test assembly of claim 5, also including an O-ring disposed between said ball of said sleeve and said socket of said outer tube.

7. The test assembly of claim 6, wherein said marker is fixedly attached to a hose clamp.

8. The test assembly of claim 7, wherein said proximity sensor is an eddy-current proximity sensor, said marker is a carbon steel marker, and said hose clamp is a stainless steel hose clamp.

9. The test assembly of claim 8, wherein said door is attached to the crankcase and said hose clamp is attached to the camshaft.

* * * * *